United States Patent [19]

Warden

[11] Patent Number: 4,969,301

[45] Date of Patent: Nov. 13, 1990

[54] RELATCHABLE LAUNCH RESTRAINT MECHANISM FOR DEPLOYABLE BOOMS

[75] Inventor: Robert M. Warden, Santa Barbara, Calif.

[73] Assignee: AEC-Able Engineering Company, Inc., Goleta, Calif.

[21] Appl. No.: 365,947

[22] Filed: Jun. 14, 1989

[51] Int. Cl.⁵ .............................................. E04H 12/18
[52] U.S. Cl. ..................................... 52/108; 254/270; 182/40; 464/37; 52/111; 52/121; 52/646
[58] Field of Search ................. 52/108, 109, 111, 121, 52/632, 646; 242/54 R, 47; 254/274, 355, 370; 182/40, 41, 141

[56] References Cited

U.S. PATENT DOCUMENTS

| | | | |
|---|---|---|---|
| 3,434,255 | 3/1969 | Rabenhorst | 52/108 |
| 3,486,279 | 12/1969 | Webb | 52/646 |
| 3,720,077 | 3/1973 | Jackson et al. | 464/37 |
| 3,724,815 | 4/1973 | Hawkin et al. | 464/37 |
| 3,739,538 | 6/1973 | Rubin | 52/108 |
| 4,334,391 | 6/1982 | Hedgepeth et al. | 52/646 |
| 4,480,415 | 11/1984 | Truss | 52/121 |
| 4,770,281 | 9/1988 | Hanks | 464/35 |
| 4,802,326 | 2/1989 | Geisthoff | 464/37 |
| 4,866,892 | 9/1989 | Satoh et al. | 52/108 |

Primary Examiner—Joseph F. Peters, Jr.
Assistant Examiner—R. B. Johnson
Attorney, Agent, or Firm—Donald D. Mon

[57] ABSTRACT

A deployable boom is constructed of springly flexible members so that it is self-biased toward a long length deployed state. A drive mechanism is operative to actuate a reel and lanyard device to retract the boom to a short length storage state and to controllably permit the boom to be extended to its long length deployed state. Latches are operated by the drive mechanism to releasably hold the boom in the short length storage state.

2 Claims, 2 Drawing Sheets

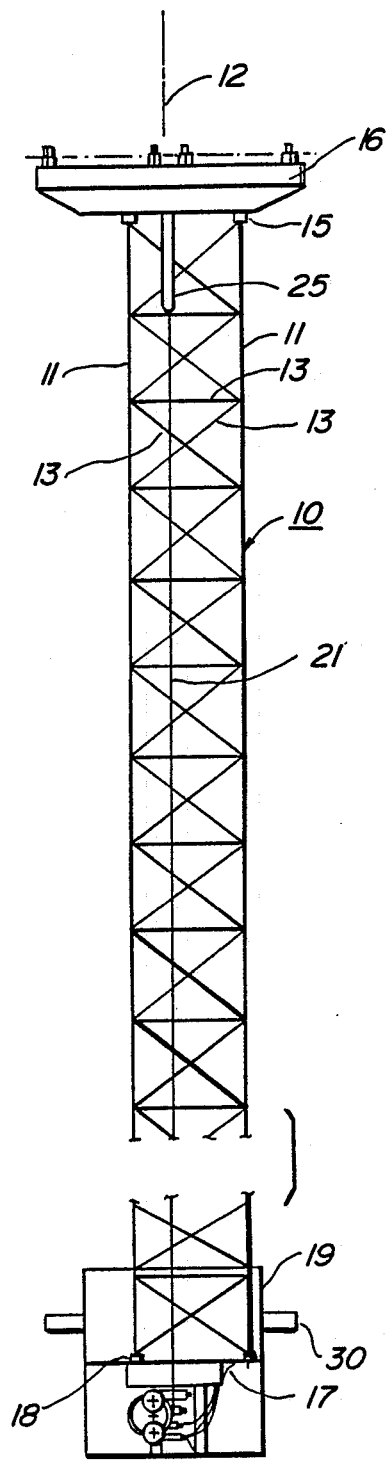
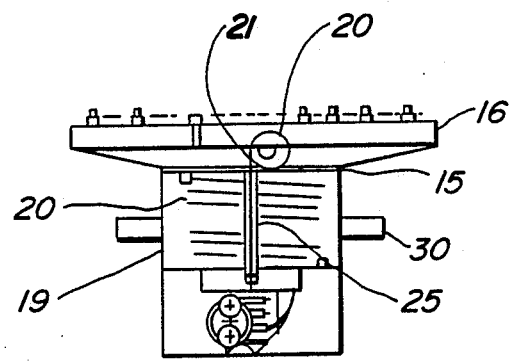
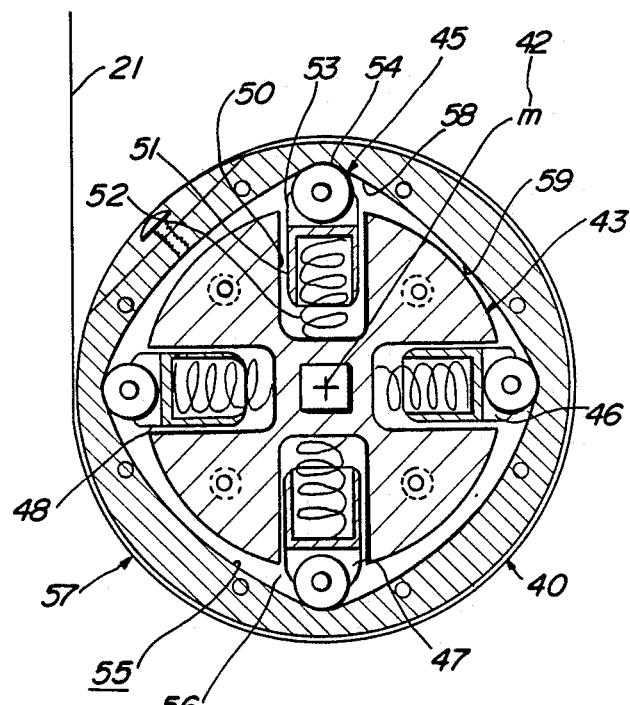
FIG. 1
FIG. 2
FIG. 4

RELATCHABLE LAUNCH RESTRAINT MECHANISM FOR DEPLOYABLE BOOMS

FIELD OF THE INVENTION

This invention relates to deployable booms of the type which have a shorter retracted length and a longer deployed length.

BACKGROUND OF THE INVENTION

Deployable booms are widely used in portable antennas, for use on the ground and for use in space. When they are deployed they have a length wh±ch does not permit them to be transported, or to be subjected to stringent forces. For this reason they are made retractable to a shorter length and are latched in the resulting smaller envelope for transportation on the ground, and for security during launch and airborne and space vehicles.

One well-known deployable boom is shown in U.S. Pat. No. 38486279 issue to James, E. Webb of NASA. This boom is characteristic of the type. It includes longerons which can be folded or bent to permit the shorter length retracted configuration, and which when deployed are braced by transverse members to resist axial collapse and bending forces.

It is evident that booms of this type must be storable in a compact, retracted configuration, and deployable to an extended, deployed configuration, the two configurations being appropriate to conditions to which the boom will be subjected at different times. The boom will be retracted during transportation and storage. It will be extended during use, for example as a stationary support for an antenna. It often is adapted for rotation, especially when used to support instruments or solar energy panels.

Arrangements for initial latching of the boom in its retracted condition are well known. So are arrangements to permit the unlatching and controlled extension of the boom. However, known arrangements have generally been one-shot. Especially for space vehicles it was sufficient for the boom to be transportable to and mounted to the vehicle be reliably latched for the launch conditions, and then to be deployed. Once deployed it was simply left there, because the vehicle was not expected to return. The terms "extended", "expanded" and "deployed" are interchangeably used herein.

With the advent of the space shuttle, this arrangement was no longer aoceptable. After its use in space, the boom would have to be returned to its retracted position and re-latched in order to survive re-entry and landing. This imposes an entirely new set of design restraints on the system. It now must reliably latch, unlatch, deploy, retract and relatch. Because the cost to launch weight into space is so very large, a conventional approach to provide separate latching and deployment controls would be at least very disadvantageous.

It is an object of this invention to provide an elegantly simple system which is bi-directionally operable to latch, unlatch, deploy, retract and relatch the boom with a single motor and single drive. It is so reliable that the motor to drive tbe system can even be removed and used for another purpose, or merely be stored separately, while the boom is either in its retracted or deployed configuration.

BRIEF DESCRIPTION OF THE INVENTION

This invention is carried out with a deployable boom which is inherently self biased toward an extended, deployed configuration. At its distal end it carries a center post. A lanyard extends from the center post through the mast to a reel at the base. The reel is directionally powered to draw the distal end to attain tbe retraoted configuration. This arrangement also permits the controlled unwinding of the lanyard from the reel to enable the boom to extend to its deployed configuration in a controlled manner.

The latching, unlatching and re-latching of the centerpost is accomplished by a latch mechanism which engages the center post when the boom is in its stored configuration.

Because the latching, unlatching and relatching operations must be accomplished while the lanyard and the boom are in their most retracted configuration and therefore not movable during these times, the reel and the drive mechanism can operate separately during part of its cycle so the latch can be operated even while the boom is fully retracted.

According to a preferred but optional feature of this invention, the latch means includes a pair of pivoted pawls adapted to engage with or disengage from the center post, and a detent to restrain the latch against release unless the latch is positively driven.

The above and other features of this invention will be fully understood from the following detailed description and the accompanying drawings, in which:

BRIEF DESCRIPTION OF THE DRAWINGS

FIG. 1 is a side elevation of a boom in its deployed configuration;

FIG. 2 is a side elevation of the boom in FIG. 1 in its stored retracted configuration;

FIG. 4 is a cutaway side view of a portion of FIG. 3.

DETAILED DESCRIPTION OF THE INVENTION

Figure 3:
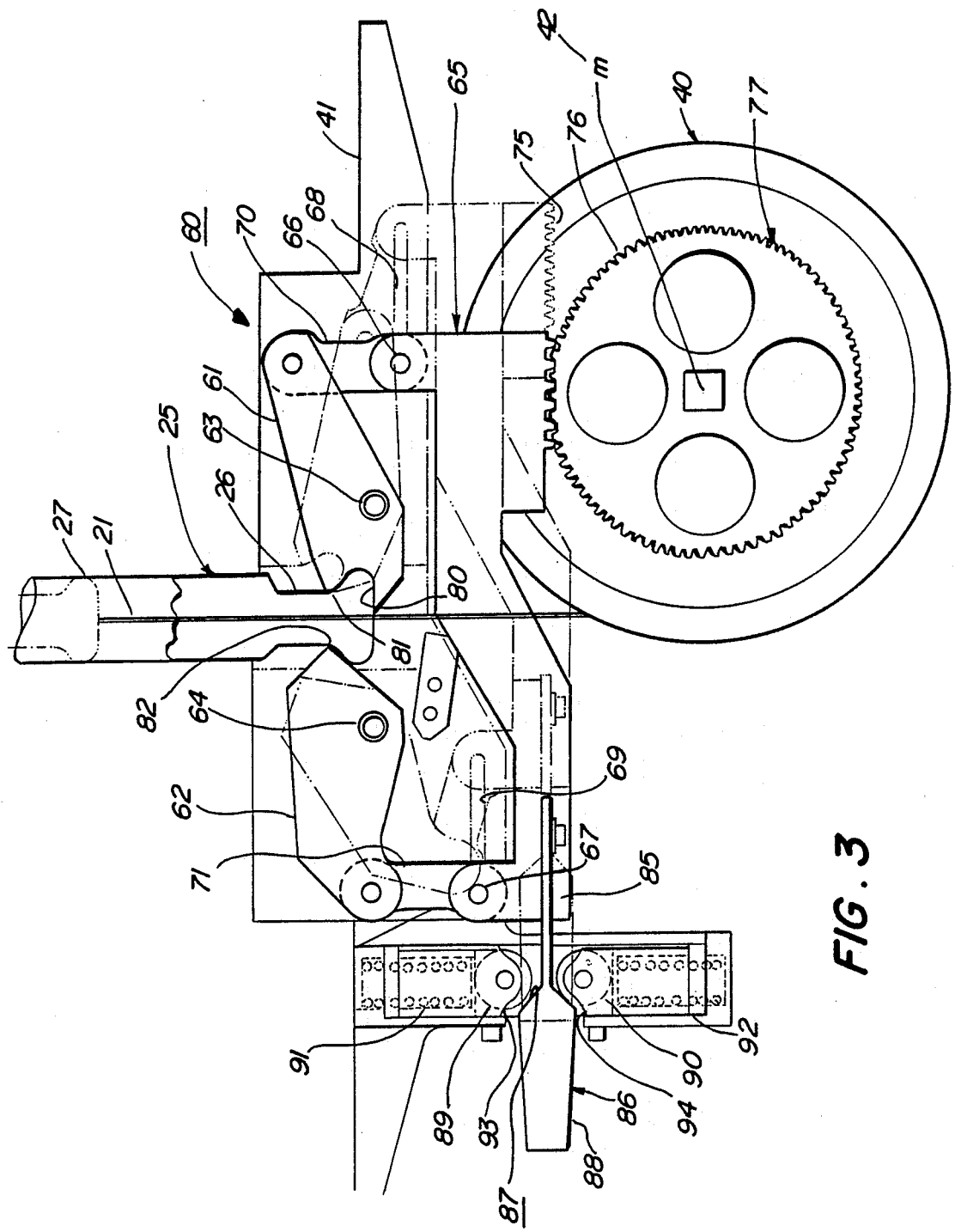
FIG. 3 is an enlarged side view, partly in schematic rotation, of a portion of the system in two conditions.

FIG. 1 shows a boom 10 in its extended, deployed configuration. It is customary for such booms to have longerons 11, usually three in number which are inherently self-biased toward the illustrated configuration. In this configuration they are parallel to an extension axis 12. These longerons are frequently made of fiberglass rods that are initially formed as long straight lengths. They can be curled into a helical or spiral configuration by appropriate axial and torsional forces and are springly flexible and thus inherently self-biased.

Batten members 13, which are of smaller fiberglass rods. provide rigidity for the deployed boom. They are readily buckled and contained with the stored longerons. An example of such a boom is shown in the above-noted U.S. Pat. No. 3,486,279 which is incorporated herein in its entirety to show a suitable boom.

At its distal end 15 the boom is fitted with a platform 16 which can serve as an instrument interface. Instruments. solar energy panels, cameras, or any other desired device to be deployed can be mounted to this platform.

The boom has a base 17 to which the proximal ends 18 of the longerons are attached. This base is disposed in a receptacle 10 which has an internal circular wall to receive the longerons in their stored configuration.

A bridle spool 20 is mounted to platform 16. It is used to initiate retraction. A lanyard 21 is fixed to the spool and bends over its periphery to project axially downward.

A center post 25 is fixed to the lanyard just below the platform. The center post extends axially beneath the platform. The lanyard passes through it and extends down to the proximal end of the boom. The center post has a recess 26 which forms a head 27 at the lower end of the post.

A mounting member 30 is formed on the receptacle to provide means to mount the receptacle to other structures such as a vehicle.

The object of this invention is to cause the boom selectively to assume the configuration of FIG. 1 or of FIG. 2. This is done by paying out or pulling in on the lanyard. The inherent self-bias of the longerons will oppose retraction but permit it when the lanyard is pulled in. It will extend the boom as permitted by the paying out of the lanyard.

In addition to this action, the boom must be latched in its stored configuration, and not be unlatched until and unless a positive drive is exerted to enable the lanyard to be payed out. Accordingly, this invention provides means to pull in and pay out the lanyard, and to maintain a positive lock in the stored configuration, utilizing a single bi-directional drive for these purposes.

This drive mechanism 40 is shown in FIGS. 8 and 4. In FIG. 3, two conditions of the mechanism are shown—in light line the unlatched condition, and in heavier line the latched condition. The drive mechanism is based on a support bracket 41 which can be attached to any suitable structure, including the receptacle. A bi-directional electric motor 42 drives a hub 48 (FIG. 4).

Hub 43 has a central axis of rotation and a boundary 44. Four cam drives 45, 46, 47, 48 are carried by the hub. Because all of these are identical, only cam drive 45 will be described in detail. A shaft 50 is drilled into the hub. A plunger 51 is fitted into the shaft. A bias spring 52 in the bottom of the shaft biases the plunger away from the axis of rotation. The plunger carries a flange 53 which mounts a cam roller 54. The roller is biased by the spring against a cam track 55 which bounds an internal cavity 56 in a reel 57. The cam track has four regions of farther extension 58 and four intermediate transition regions 59. When the rotation of the reel is not too strongly opposed, the cam rollers will drive the reel. When the reel is strongly enough opposed, the hub can drive the rollers out of regions 58 and over regions 59 (approximately 30 degrees). This enables the hub to continue to rotate even when the reel can turn no farther because the boom is fully retracted.

The lanyard is attached to the reel so as to be drawn in or payed out, depending on the direction of rotation.

Latch mechanism 60 is also mounted to bracket 41. Its action is centered around a primary latch pawl 61 and a secondary latch pawl 62. These are hinged to the bracket for rotation around respective fixed hinge pins 63, 64.

A rack 65 is supported for lateral sliding movement relative to the bracket by pins 66, 67 engaged in slots 68, 69. Pins 66 and 67 also act as hinge pins for connecting links 70, 71 which in turn are pivoted to latch pawls 61, 62, respectively.

The rack has gear teeth 75 engagable with teeth 76 on drive gear 77. Notice there is a tooth relief 78 at the left end of the rack teeth in FIG. 3.

Primary latch pawl 61 has an engagement tooth 80 and a retention tooth 81, which between them form a recess to receive and trap the head on the center post in the latched position. When in the unlatched position (thin line) the engagement tooth over- hangs the lower part of the bead. In the latched condition (heavy line) the two teeth 82, 81 trap the head in the recess.

Secondary latch pawl 62 has a single retention tooth 82 which functions with primary retention tooth 81 to hold the head trapped in the recess.

The latch pawls are positioned by the tie bar by means of connecting links 70, 71.

A tie bar 85 is mounted to the rack and carries a detent wedge 86. The detent wedge has a detent shoulder 87 and a tapered deflector portion 88. Detent rollers 89, 90 are mounted to the bracket. They include bias springs 91, 92 and roller supports 93, 94. The deflector surface is able to force the rollers apart to pass them. and then the detent rollers can move in against the detent shoulder to trap the detent wedge and lock it in place. A strong enough pull can remove the detent wedge from this position by separating the detent rollers in the unlatched position.

The operation of this system is straight-forward. Starting with the stored and latched condition shown in FIG. 2 and in heavy line in FIG. 3, it will be observed that having previously moved the rack to the left in FIG. 3, it will have moved the detent wedge past the detent rollers. This will hold the latch against release even if the motor is temporarily removed.

The rack has pushed the connecting links toward an upright position, which has moved the pawls so as to trap the head of the center post. Now the lanyard can not be moved either way until the motor turns the drive gear to unlatch the detent wedge. Notice that the gear teeth are engaged in the latched condition. Appropriate limit switches and stops prevent excessive drive of the rack into the latched position.

To unlatch the system and deploy the boom, the motor drives the gear clockwise in FIG. 8. This draws the detent wedge to the right, past the detent rollers. The connecting links are drawn down, moving the pawl teeth to the light line condition, wherein the head of the center post is freed. The center post and the lanyard then can move away from the latch for deployment.

In case of any resistance or "sticktion" the engagement tooth actually pushes on the centerpost to help initiate deployment.

The gear continues to rotate to pay out the lanyard, but it runs out of teeth on the rack and then turns in the relief. If desired the first tooth or two of the rack next to the relief may be modified or made movable to avoid jamming when the rotation is reversed.

The boom will finally be fully extended. When it is to be retracted, the motor is run in the reverse direction, to pull in the lanyard. When the head reaches and contacts the engagement tooth on the primary latch pawl, the rack will be moved to the left in FIG. 8 and the teeth will re-engage. Continued rotation of the gear and reel will draw the lanyard and center post down until the heavy line position is reached. Then they cannot move down any farther. The reel will move at the cams while the gear This system is elegantly simple and reliable, and provides, with only one drive, means to attain the objectives of a deployable and re-storable boom.

This invention is not to be limited by the embodiment shown in the drawings and described in the description, which is given by way of example and not of limitation, but only in accordance with the scope of the appended claims.

I claim:

1. In combination with a deployable boom having a short retracted length and a long deployed length, said boom having a proximal end and a distal end, a plurality of springly flexible members, whereby said beam is inherently self-biased toward its deployed length, and adapted to be moved into its short retracted length by a compressive axial pulls at said distal end toward proximal end, the improvement therewith comprising:

a flexible lanyard attached to said distal end, a center post attached to said lanyard extending axially from said distal end toward said proximal end, said center post having a head, said head having a lateral dimension;

drive means located adjacent said proximal end for paying out and pulling in said lanyard, a driven hub and a real drivable by said hub, said lanyard being attached to said reel, drive-transition means interlinking said hub and said reel to permit rotation of said boom when said hub is in said retracted length even when said reel is restrained against rotation, motor means for driving said hub;

a supporting structure located at the proximal end of said boom, a primary latch pawl and a secondary latch pawl rotatably mounted on said supporting structure and adapted to latch said boom in the retracted length, said primary latch pawl having an engagement tooth and a retention tooth forming a recess to trap said head, said secondary latch pawl having a retention tooth to cooperate with the retention tooth on the primary latch pawl to hold said tooth, said engagement tooth when in its unlatched position laying within the said lateral dimension to be contacted by said head;

a rack having teeth, a pair of connecting links hinged to said rack and to the respective primary and secondary latch pawls, and a drive gear having teeth engagable with the teeth on said rack, whereby rotation fo said gear by said motor means moves said rack to pivot the latches between their unlatched and latched positions.

2. Apparatus according to claim 1 in which a detent wedge is carried by said rack, and in which detent rollers are deflectively mounted to said supporting structure whereby when the boom is in said retracted short length the detent wedge and detent rollers restrain said rack in the latched condition.

* * * * *